United States Patent [19]
Haller

[11] Patent Number: 5,897,430
[45] Date of Patent: Apr. 27, 1999

[54] PROTECTIVE ENCLOSURE

[75] Inventor: Hubert Haller, Trossingen, Germany

[73] Assignee: Hawema Werkzeugschleifmaschinen GmbH, Germany

[21] Appl. No.: 08/745,722

[22] Filed: Nov. 12, 1996

[30] Foreign Application Priority Data

Nov. 10, 1995 [DE] Germany .................. 295 17 783 U

[51] Int. Cl.⁶ ................................................. B24B 55/04
[52] U.S. Cl. .......................................... 451/451; 451/455
[58] Field of Search .................... 451/455, 451, 451/452; 160/29, 38

[56] References Cited

U.S. PATENT DOCUMENTS

| | | | |
|---|---|---|---|
| 2,655,067 | 10/1953 | Bechler | 451/451 |
| 4,597,698 | 7/1986 | Liebtrau | 451/455 |
| 5,178,499 | 1/1993 | Umeda et al. | 451/455 |

FOREIGN PATENT DOCUMENTS

| | | | |
|---|---|---|---|
| 2923920 | 12/1980 | Germany | 451/451 |
| 3513944 | 10/1986 | Germany | 451/451 |

*Primary Examiner*—Robert A. Rose
*Attorney, Agent, or Firm*—Stein, Pendorf & Van Der Wall

[57] ABSTRACT

A protective enclosure for a machine tool is constructed so as to be a free standing assembly completely independent from the machine tool. The protective enclosure is provided on rollers so that unimpeded access may be had to the machine tool by rolling away the protective enclosure. The protective enclosure is further provided with a safety locking system for interrupting operation of the machine tool if the protective cover is removed during operation or preventing starting of the machine tool if the protective cover is not fully in place.

12 Claims, 4 Drawing Sheets

PROTECTIVE ENCLOSURE

BACKGROUND OF THE INVENTION

1. Field of the Invention

The invention concerns a protective enclosure for a numeric controlled machine tool, and in particular a tool grinding machine.

2. Description of the Related Art

This type of protective enclosure is constructed of side walls which completely enclose the machine tool, or at least in those areas which are accessible by persons. Insofar as machine tools are set up free standing in a work space, the side walls are constructed to completely surround the work tool machine. As a rule therefore this type of protective enclosure also has a roof or ceiling element, so that the machine tool is completely closed off on all sides.

On the sides doors, as a rule sliding doors, are provided, through which access can be had to a work area of the machine tool. The doors are provided with a safety locking (interrupt) mechanism, which is connected to the machine controller. This serves to ensure that a work process only begins after the doors have been completely closed. On the other hand, the machine tool is immediately brought to a halt when the doors are opened during the running of the work process. With respect to the manner of operation, and the overall design of the safety system, there are various regulations which exist and have an impact thereon, such as for example the CE Regulations.

A disadvantage of this type of safety enclosure is the high cost of assembly and transport, since the protective enclosure is a component of the machine tool. Further problems occur during operation, insofar as attendance, maintenance, repair and cleanup operations are to be carried out. It is usually expedient to dismantle parts of the protective enclosure, in order to have access to certain places.

SUMMARY OF THE INVENTION

The invention is thus concerned with the object of providing a protective enclosure of the above described type, which is free of the above mentioned disadvantages. In particular, it is to be made possible, to simplify and facilitate access to the machine tool itself.

The invention is based upon the idea, of conceptualizing the protective enclosure as a free standing assembly completely independent from the machine tool. Therewith, advantages are already brought about during the production of a machine provided with a protective enclosure of this type, since unimpeded access may be had to the machine tool for testing and experimental runs and also in this configuration the machine can be adjusted or measured. There is also a reduction of the investment for transport to the location of installation, since the machine tool on the one hand and the protective enclosure on the other hand can be handled or managed separately from each other and even, in certain cases, may be separately transported. For installation the assembly expenditure is substantially reduced.

In the realization of this idea, the protective enclosure is provided with rollers or castors and has an opening on a side of the type, that it can be pushed or wheeled over the machine tool. This is particularly advantageous during the attendance and service operations and during cleaning of the machine, since the protective enclosure can be removed from the machine without any problem by simply by rolling away. The machine tool is thereby made accessible from all sides so that the desired operation can be conducted quickly and accordingly economically.

For connecting the security locking system to the machine tool, connecting means are provided, with are detachable or unplugable. Therewith it is possible to conform to the safety requirements in a conventional means and manner, without there being any need for complex or inconvenient manipulation of the controller.

Preferably the protective enclosure as an approximately U-shaped layout or floor plan, so that the side walls completely surround the machine tool on three sides. This type of configuration can be sufficient in the case that the machine tool is installed in the proximity of a wall or the like, so that the protective enclosure essentially only has to be pushed over the machine and brought flush against the wall. Therewith a complete enclosure of the machine tool is accomplished.

This same configuration can then also be employed for a machine tool which is set up in an open space, wherein the opening essentially has to be closed off by a closure wall. Herein it is essentially only necessary to be ensure that the closure wall is releasable, in order to enable a simple removal for the above described attendance, repair or cleaning purposes.

One simplified possibility therefore is comprised therein, that the closure wall is secured by means of screws. More preferred are, however, also already well known securing means such as, for example, hinges and oppositely lying securing elements.

For attainment of a complete enclosure, the protective enclosure is provided with a ceiling element, which makes possible a total encapsulation of the machine tool.

The protective enclosure is preferably provided with one or more elements, which enables an optimal cooperation with the machine tool and is adjusted to the specific requirements thereof.

So for example, machine tools are available in the commercial market, in which a mobile cooling means device is capable of being introduced into the side of the machine stand. For this type of machine configuration it is advantageous, when the protective enclosure or, as the case may be, the side wall, is provided with an access opening, of which the design and size correspond with that of the respective receptacle opening in the machine tool. Therewith it is possible that the mobile cooling means device is introducible or as the case may be removable from the machine tool without removal of the protective enclosure.

Insofar as cooling means are employed for the operating process, the side walls of the protective enclosure can be provided with drainage or deflecting conduits, which are contoured to conform exactly to the machine tool and convey cooling means to the receptacle zones provided therefore on the machine side, where it can drip off in a targeted manner.

Preferably, guide means are provided on the side walls, which simplify the mounting of the protective enclosure and in addition to this have an exact conformity between the protective enclosure and the machine tool. This last point is important particularly in the case that the protective enclosure is provided with machine tool construction components such as for example the above mentioned conduit for cooling materials.

Particular advantages become apparent during manipulation or operation in the case that the guide elements are provided as guide rollers which are mounted on guide rails. The guide rollers make possible a relatively frictionless motion for the opening up of the protective enclosure, so that the expenditure in energy for the relocation of the protective enclosure is kept at a minimum For further simplification or facilitation it is advantageous to provide the protective enclosure with a total of four transport rollers, of which two are steerable rollers and two are fixed rollers. Therewith it becomes possible during opening up to push the protective enclosure in the desired direction, so that in particular in combination with the guide rollers an extremely simple manipulation is possible.

For realization of a releasable connection between the security locking system and the protective enclosure and the controller of the machine tool, a plug-in connector has been found to work extremely well. This type of connector makes possible a rapid establishment and disconnection of the connection, wherein by means of a well known geometric construction of the connecting elements a unique arrangement is provided which is impossible to connect incorrectly.

BRIEF DESCRIPTION OF THE DRAWINGS

The invention will now be further described with reference to the illustrative embodiment schematically represented in the figures. There is shown.

DETAILED DESCRIPTION OF THE INVENTION

Figure 4:
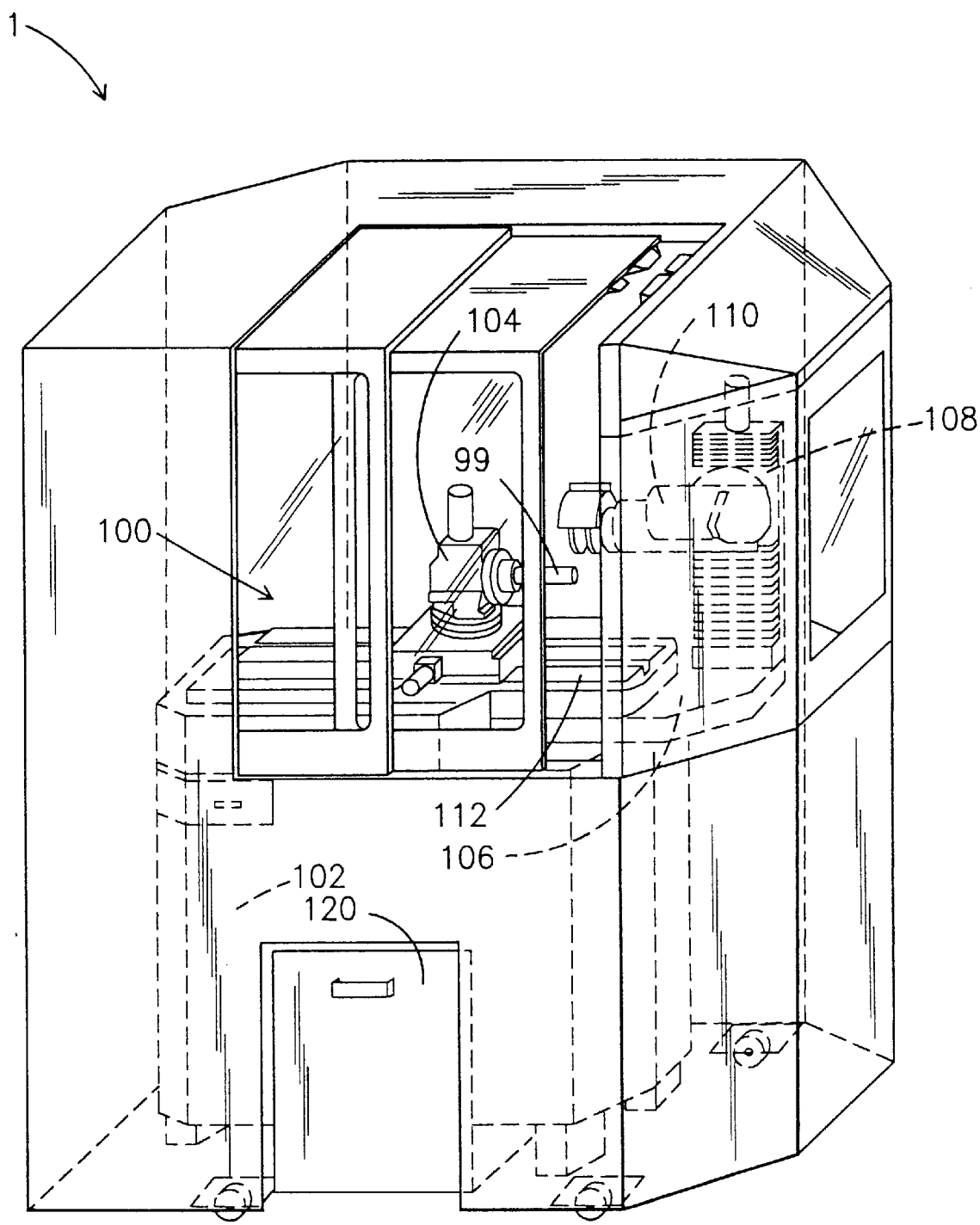
FIG. 4: Protective enclosure, in perspective external view, pushed over the grinding machine tool, closing off wall assembled

The protective enclosure 1 shown in the figures is designed to conform exactly to the grinding machine tool 100, as known for example from German Patent Application P 44 31 634.8. It is comprised (see for example FIG. 4) essentially of a machine stand 102, which receives a pivotably mounted carrier arm 106. On the carrier arm 106 a grinding column 108 is mounted, which makes possible a vertical movement of the grinding head 110.

With the aid of the grinding head 110 a work piece 99, for example a borer or a miller, can be ground or sharpened. For this the work piece 99 is fixed to a work piece carrier 104, which is anchored on a work platform 112 integrated on a machine stand 102.

Further, a cooling means device 120 is provided, which is designed to be mobile and which can be introduced into a therefore provided opening in the machine stand.

Figure 1:
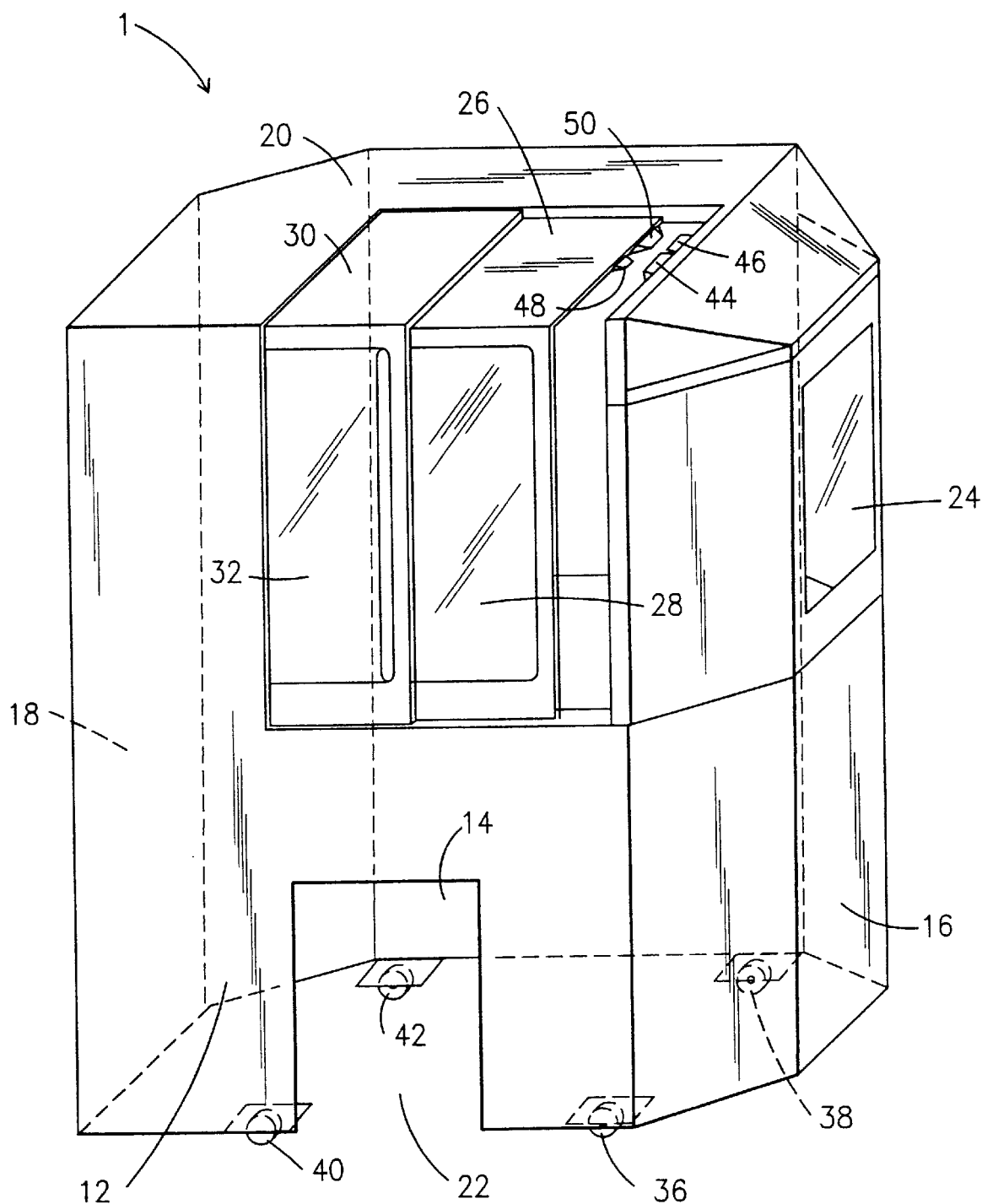
FIG. 1: Protective enclosure, in perspective external view.

As can be seen for example from FIG. 1, the protective enclosure 1 is essentially comprised of three side walls 12, 14, 16 a closing off wall 18 and a sealing element 20. They completely enclose the grinding machine tool 100 according to FIG. 4.

The two side walls 12, 14 are designed to be essentially planar. The front side wall 16 in comparison is designed to be contoured. The contour is so selected, that a mobile ground plan results. This shape is selected for reasons of space and weight savings, since in this area the pivotable carrier arm 106 carries out a semicircular movement as seen from a top view, to which the geometry of the side wall 16 substantially corresponds.

The side walls 12, 14, 16 and the sealing element 20 are fixedly connected to each other in a known manner which need not be further discussed here. The result is a tight and stable construction, which can be manipulated as a free standing assembly independent of the machine tool 100. It is with respect to its ground plan, designed to essentially have a U-shape, so that it can be pushed over the grinding machine tool 100 which is set up in its place of use.

For simplification of the sliding movement the protective enclosure 1 is mounted on rollers 36, 38, 40, 42. The two rollers, which are adjacent to the side wall 16, are constructed as steerable rollers 36, 38, in comparison to which the other rollers are constructed as fixed guide rollers 40, 42. The steering rollers 36, 38 make possible a steering movement, so that the protective enclosure 1 can be exactly positioned The side wall 12 and the ceiling element 20 are cut out for reception of two sliding doors 26, 30. The sliding doors 26, 30 are provided with observation windows 28, 32 on their side, which enable a view into the inside of the protective enclosure 1 and therewith enable the observation of the running of the working process. The sliding doors 26, 30 are on the one side slidably mounted in a guide track 34, which is provided in the sealing element 20. On the other side they are supported in the lower region of the side wall 12 in a well known manner which need not be described in greater detail here.

For conformance with the safety requirements, in particular CE-Requirements, the sliding door 26 is provided with contact tongues 48, 50, which operate in coordination with correspondingly provided safety switches 44, 46, which are secured to the side wall 16. The safety switches 44, 46 in combination with the contact tongues 48, 50 are a component of a safety locking system which, on the one hand, during opening of the sliding door 26 during a running work process interrupt this immediately and, on the other hand, make possible a startup of the work process of the grinding machine tool 100 only then when the sliding door 26 is closed. For this a here not further discussed connection is provided between and the security switches 44, 46 of the grinding machine tool 100. This connection is designed to be releasable, and more particularly in the form of a plug-in system, so that after a sliding of the protective enclosure 1 over the grinding machine tool 100 a coupling of the safety system can rapidly be established.

In the side wall 16 a further observation window 24 is provided, which in the immediate illustrative embodiment is not capable of being opened and would make possible a further possible observation from a different perspective or advantage point.

Figure 2:
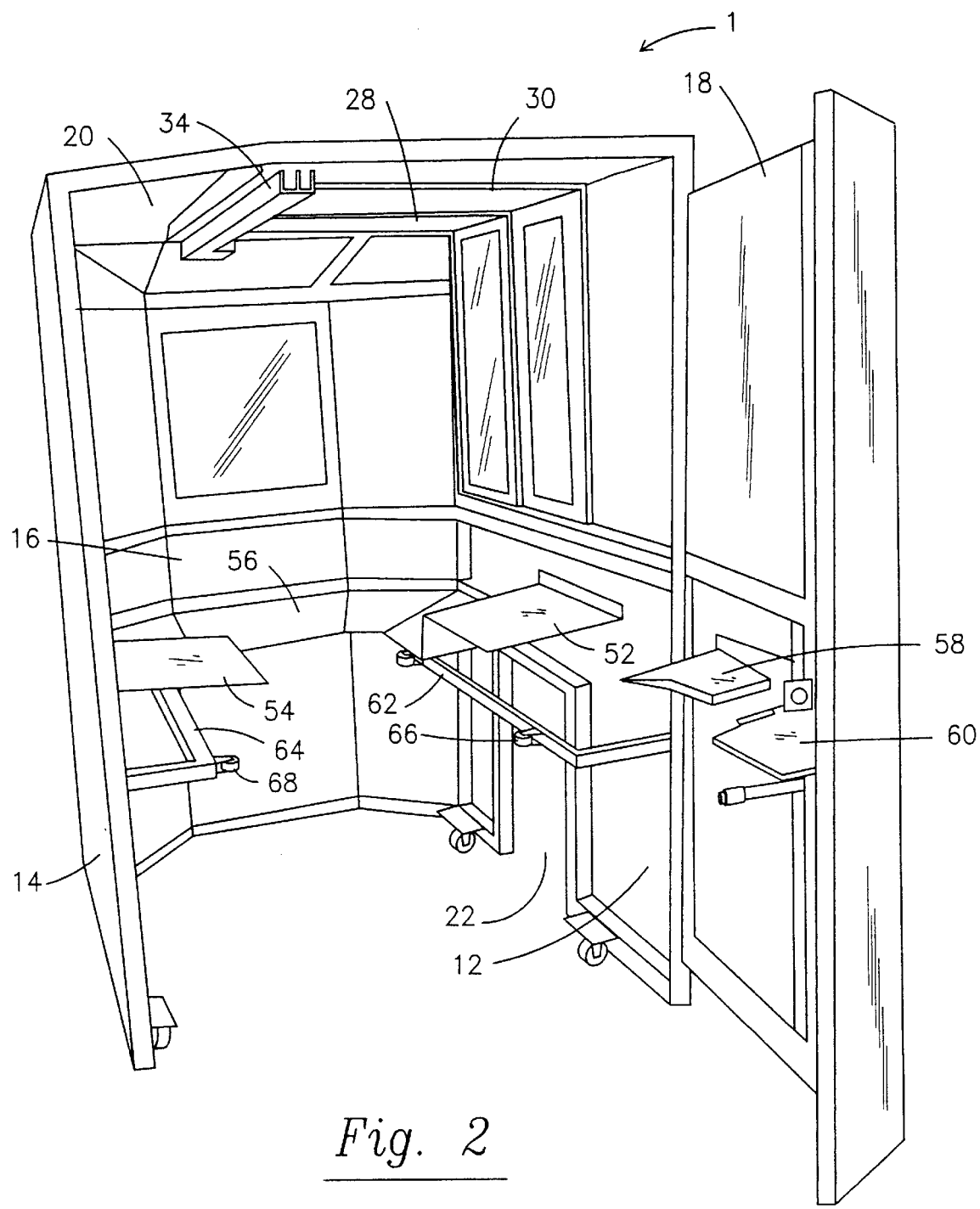
FIG. 2: Protective enclosure, in perspective internal view, closing off wall opened.
Figure 3:
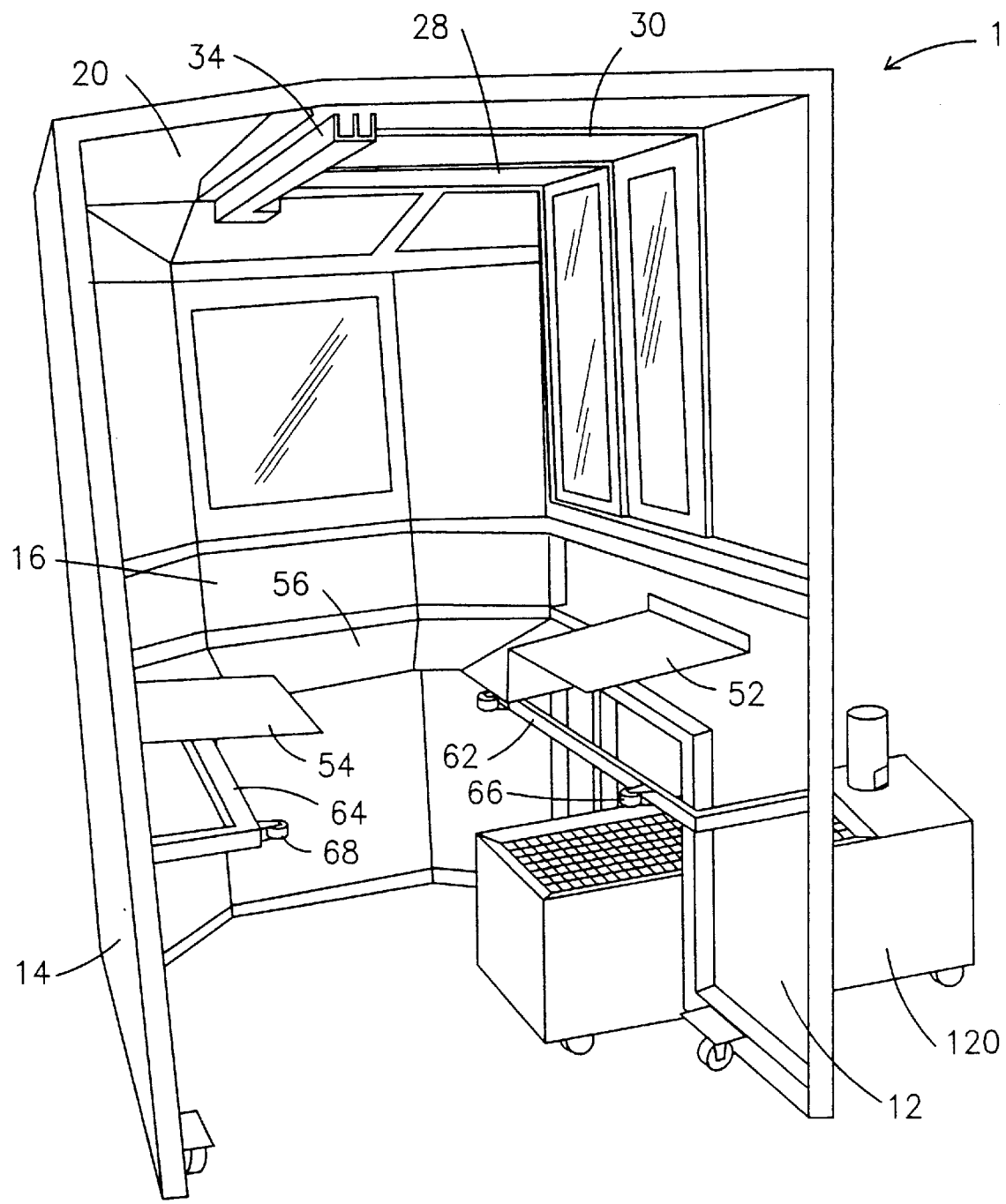
FIG. 3: Protective enclosure, in perspective internal view, closing off wall removed, cooling means container partially introduced.

As can be seen particularly from FIGS. 2 and 3, the protective enclosure 1 is provided with further components or features, which on the one hand improve the manipulability of the protective enclosure 1 and on the other hand improve the operation of the grinding machine tool 100.

The side walls 12 and 14 guide rails 62, 64 are provided on oppositely lying sides facing each, which make possible a precise alignment of the protective enclosure 1 when sliding this over the grinding machine tool 100. Additional guide rollers 66, 68 provided on the guide rails 62, 64 can facilitate the sliding movement, since the guide rollers 66, 68 can abut against the machine stand 102 and the rollers be guided thereby.

After the protective enclosure 1 is pushed over the grinding machine tool 100 and its definitive position has been achieved, it is on its back side closed off with a enclosure wall 18. The enclosure wall 18 is in the simplest case fixed or secured by means of screws in the presented side of the side walls 12, 14 and the ceiling element 20. It is also conceivable, that the closing off wall 18 is attached on one side by hinging mechanisms and that a securing mechanism is provided on the oppositely lying side.

The closing off wall 18 is in the previous illustrative embodiment constructed angularly, in order that the ground plan contour of the protective enclosure 1 is conformed as much as possible to that of the grinding machine tool 100.

The protective enclosure 1 is provided with an introduction opening 22 in the area of the side wall 12, through which a cooling means container 120 corresponding to the grinding machine tool 100 can be introduced. This is of particular advantage, since in this manner the cooling means can be changed out as a consumable material without removal of the protective enclosure 1.

In the inside of the protective enclosure 1 there are further provided duct works 52, 54, 56, 58, 60, of which the design and arrangement is so selected, that during the working of the work piece 99 expended cooling medium is captured and is channeled so as to drip into the cooling medium container.

From the above it can be seen, that with the help of the inventive concept it has been accomplished to provide a economical complete protective enclosure, which has advantages both in the construction as well also as during operation of the machine tool.

Figure Legend

| | | | |
|---|---|---|---|
| 1 | Protective enclosure | 56 | Conduit |
| 12 | Side wall | 58 | Conduit |
| 14 | Side wall | 60 | Conduit |
| 16 | Side wall | 62 | Guide rail |
| 18 | Closing off wall | 64 | Guide rail |
| 20 | Sealing element | 66 | Guide roller |
| 22 | Introduction opening | 68 | Guide roller |
| 24 | Observation window | | |
| 26 | Sliding door | 99 | Work piece |
| 28 | Observation window | 100 | Grinding machine tool |
| 30 | Sliding door | 102 | Machine stand |
| 32 | Observation window | 104 | Work piece carrier |
| 34 | Guide rails | 106 | Carrier arm |
| 36 | Steerable roller | 108 | Grinding column |
| 38 | Steerable roller | 110 | Grinding head |
| 40 | Running roller | 112 | Work platform |
| 42 | Running roller | 120 | Cooling means container |
| 44 | Safety switch | | |
| 46 | Safety switch | | |
| 48 | Contact tongue | | |
| 50 | Contact tongue | | |
| 52 | Conduit | | |
| 54 | Conduit | | |

I claim:

1. Protective enclosure for a numerically controlled machine tool having an operating area, said protective enclosure comprising:

four sides, including at least three side walls adapted to enclose said machine tool on at least three sides, and wherein at least one of said four sides has an opening so dimensioned that the protective enclosure can be rolled over the machine tool (100), at least one door provided on one of said at least three side walls, through which said operating area of said machine tool can be accessed, a safety locking system connected to the door and to the controller, with a releasable connecting means provided between the door and controller, wherein said protective enclosure is a mobile structure completely independent from the machine tool (100), and is provided with rollers (36, 38, 40, 42), wherein said rollers provide a means for rolling said protective enclosure over the machine tool.

2. Protective enclosure as in claim 1, wherein said machine tool is a grinding machine tool.

3. Protective enclosure according to claim 1, wherein said at least three side walls define an essentially U-shaped ground plan, so that the side walls (12, 14, 16) completely enclose the machine tool (100) on three sides.

4. Protective enclosure according to claim 1, wherein a closing off wall (18) is removably provided over said opening.

5. Protective enclosure according to claim 4, wherein said closing off wall (18) is secured with screws.

6. Protective enclosure according to claim 1, wherein said protective enclosure (1) is closed off on the upper side with a ceiling element (20).

7. Protective enclosure according to claim 1, wherein said machine tool is adapted for receiving a removable container for containing cooling medium, and wherein an insertion opening (22) is provided in one of said side walls (12) adapted for receiving said mobile cooling means container (120).

8. Protective enclosure according to claim 1, wherein conduits (52, 54, 56) are provided in the side walls (12, 14, 16) adapted for receiving and conveying cooling medium.

9. Protective enclosure according to claim 1, wherein guide elements (62, 64, 66, 68) are provided on the side walls (12, 14).

10. Protective enclosure according to claim 9, wherein the guide elements are guide rollers (66, 68).

11. Protective enclosure according to claim 9, wherein a total of four rollers are provided, of which two are steerable rollers (36, 38) and two are fixed rollers (40, 42).

12. Protective enclosure according to claim 1, wherein said releasable connective means is a plug-in connective means.

* * * * *